United States Patent
Albano et al.

[11] Patent Number: 5,948,868
[45] Date of Patent: Sep. 7, 1999

[54] FLUOROELASTOMERIC COMPOSITIONS

[75] Inventors: Margherita Albano; Claudio Pizzi, both of Milan; Ivan Wlassics, Rapallo; Vincenzo Arcella, Novara, all of Italy

[73] Assignee: Ausimont, S.P.A., Milan, Italy

[21] Appl. No.: 08/733,936

[22] Filed: Oct. 18, 1996

[30] Foreign Application Priority Data

Oct. 20, 1995 [IT] Italy .................. MI95A2179

[51] Int. Cl.$^6$ ........................................ C08F 8/00
[52] U.S. Cl. .................. 525/276; 525/298; 525/312; 525/314
[58] Field of Search .................. 525/276, 298, 525/312, 314

[56] References Cited

U.S. PATENT DOCUMENTS

| | | |
|---|---|---|
| 3,810,874 | 5/1974 | Mitsch et al. . |
| 4,035,565 | 7/1977 | Apotheker et al. . |
| 4,214,060 | 7/1980 | Apotheker et al. . |
| 4,243,770 | 1/1981 | Tatemoto et al. . |
| 4,501,869 | 2/1985 | Tatemoto et al. . |
| 4,564,662 | 1/1986 | Albin . |
| 4,694,045 | 9/1987 | Moore . |
| 4,745,165 | 5/1988 | Arcella et al. . |
| 4,789,717 | 12/1988 | Giannetti et al. . |
| 4,831,085 | 5/1989 | Okabe et al. . |
| 4,864,006 | 9/1989 | Giannetti et al. . |
| 4,943,622 | 7/1990 | Naraki et al. . |
| 5,173,553 | 12/1992 | Albano et al. . |

FOREIGN PATENT DOCUMENTS

| | | |
|---|---|---|
| 0 136 596 | 4/1985 | European Pat. Off. . |
| 0 199 138 | 10/1986 | European Pat. Off. . |
| 0 407 937 A1 | 1/1991 | European Pat. Off. . |
| 0 410 351 A1 | 1/1991 | European Pat. Off. . |
| 0 661 312 | 5/1995 | European Pat. Off. . |
| 0 661 304 A1 | 7/1995 | European Pat. Off. . |
| 0 638 149 A2 | 11/1995 | European Pat. Off. . |
| 0 683 149 A3 | 3/1996 | European Pat. Off. . |
| 39 25 743 | 8/1990 | Germany . |

OTHER PUBLICATIONS

I.L. Knunyants et al. "Izv. Akad, Nauk. SSSR", Ser, Khim, 1964(2), pp. 384–6.

*Primary Examiner*—Bernard Lipman
*Attorney, Agent, or Firm*—Finnegan, Henderson, Farabow, Garrett, & Dunner, L.L.P.

[57] ABSTRACT

Curing system for fluoroelastomers curable by peroxidic route which comprise iodine comprising as curing agent a bis-olefin having general formula $$R_1R_2C=C(R_3)-Z-C(R_4)=CR_5R_6$$

wherein
$R_1, R_2, R_3, R_4, R_5, R_6$, equal to or different from each other, are H or alkyl $C_1-C_5$; Z is a linear or branched alkylenic or cycloalkylenic radical $C_1-C_{18}$, optionally containing oxygen atoms, preferably at least partially fluorinated, or a (per)fluoropolyoxyalkylenic radical.

15 Claims, No Drawings

FLUOROELASTOMERIC COMPOSITIONS

The present invention relates to new fluoroelastomeric compositions having improved thermal resistance at high temperatures.

It is known that fluoroelastomers curing can be carried out both ionically and by peroxides.

In the ionic curing, suitable during agents, for instance polyhydroxylated compounds such as bisphenol AF, in association with accelerators such as for instance tetraalkylammonium, phosphonium or aminophosphonium salts, and added to the fluoroelastomer.

In the peroxidic curing, the polymer must contain curing sites capable of forming radicals in the presence of peroxides. Therefore cure-site monomers containing iodine and/or bromine are introduced in the chain, as described for instance in U.S. Pat. No. 4,035,565, U.S. Pat. No. 4,745,165 and EP 199,138 or in alternative to the indicated system or contemporaneously, in the polymerization phase, chain transfer agents containing iodine and/or bromine can be used, which give rise to iodinated and/or brominated end groups, see for instance U.S. Pat. No. 4,243,770 and U.S. Pat. No. 5,173,553. The curing by peroxidic route is carried out, according to known techniques, by addition of peroxides capable of generating radicals by heating, for instance dialkylperoxides, such as di-terbutylperoxide and 2,5-dimethyl-2,5-di(terbutylperoxy)hexane, etc.

Other products are then added to the curing blend, such as:
 curing coagents, among which the most commonly used are triallyl-cyanurate and preferably triallylisocyanurate (TAIC) etc.;
 a metal compound, in amounts comprised between 1 and 15% by weight with respect to the polymer, selected from oxides or hydroxides of divalent metals, such as for instance Mg, Ca, etc.;
 other conventional additives, such as mineral fillers, pigments, antioxidants, stabilizers and the like.

The fluoroelastomers ionically cured compared with the fluoroelastomers cured by peroxidic route result to be more stable when submitted to high temperatures (superior thermal resistance at high temperatures).

As a matter of fact, by ionic curing, cured products are obtained which maintain good final properties, in particular thermal resistances also at temperatures higher than 250° C. The fluoroelastomers cured by peroxidic route can be used, instead, up to 230° C. as at higher temperatures they showed clear loss of the mechanical properties, in particular the elongation at break reaches variations higher than 100%. The peroxidic curing does not give therefore fluoroelastomer having thermal resistance higher than 230° C.

However the drawback of the ionic curing resides in that the handmade articles show lower chemical resistance in comparison with those obtained by peroxidic curing.

Moreover, the fluoroelastomers having high content in fluorine, in general without the presence of VDF units in the polymer, cannot be ionically cured.

Therefore in the application fields where a high chemical resistance combined with a high thermal resistance at high temperatures, even higher than 300° C., is required, the need was felt to have available cured articles allowing this combination of properties.

An object of the present invention is the obtainment of fluoroelastomers having improved thermal resistance at high temperatures, higher than 250° C. or more, in fluoroelastomers cured by peroxidic route, containing iodine.

It is well known that there is a great request of fluoroelastomers which have, for a great variety of applications, a high chemical resistance combined with a high thermal resistance at high temperatures. For instance gaskets and seal rings, for applications for which it is required both a good chemical and thermal resistance also at high temperatures, higher than 200° C., preferably higher than 250° C. or 300° C.

It has been surprisingly and unexpectedly found that it is possible to find a solution to the technical problem described above if a particular curing system as described below is used.

An object of the present invention is a curing system for fluoroelastomers curable by peroxidic route which comprise iodine comprising as curing agent a bis-olefin having the general formula:

wherein:
 $R_1$, $R_2$, $R_3$, $R_4$, $R_5$, $R_6$, equal to or different from each other are H or $C_1$–$C_5$ alkyls, linear or branched when possible;
 Z is a linear or branched alkylenic or cycloalkylenic radical $C_1$–$C_{18}$, optionally containing oxygen atoms, preferably at least partially fluorinated, or a (per)fluoropolyoxyalkylenic radical.

In the formula (I), Z is preferably a perfluoroalkylenic radical $C_4$–$C_{12}$, more preferably $C_4$–$C_8$ while $R_1$, $R_2$, $R_3$, $R_4$, $R_5$, $R_6$ are preferably hydrogen.

When Z is a (per)fluoropolyoxyalkylenic radical it can comprise units selected from the following ones:
 —$CF_2CF_2O$—, —$CF_2CF(CF_3)O$—, —$CFX_1O$— wherein $X_1$=F, $CF_3$, —$CF_2CF_2CF_2O$—, —$CF_2CF_2CH_2O$—, —$C_3F_6O$—.

Preferably Z has the formula:

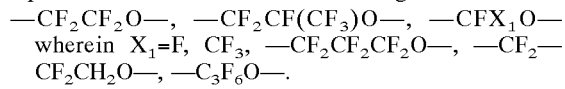

wherein:
 Q is an alkylenic or oxyalkylenic radical $C_1$–$C_{10}$ p is 0 or 1; m and n are such numbers that the m/n ratio is comprised between 0.2 and 5 and the molecular weight of said (per)fluoropolyoxyalkylenic radical is comprised between 500 and 10,000, preferably between 1,000 and 4,000. Preferably Q is selected from: —$CH_2OCH_2$—; —$CH_2O(CH_2CH_2O)_sCH_2$—, wherein s is an integer from 1 to 3 The bis-olefins of formula (I) wherein Z is an alkylenic or cycloalkylenic radical can be prepared according to what described for instance by I. L. Knunyants et al in Izv. Akad. Nauk. SSSR, Ser. Khim., 1964(2), 384–6, while the bis-olefins containing (per)fluoropolyoxyalkylenic sequences are described in U.S. Pat. No. 3,810,874.

The amount of curing agent is that sufficient for curing, which is generally comprised between 0.5–10% by weight with respect to the polymer, preferably 1–5% by weight.

The fluoroelastomers curable by peroxidic route according to the present invention are preferably those containing iodine as radical attack site.

The fluoroelastomers containing iodine, as already said are known products. They contain iodine in amounts generally comprised between 0.001 and 5% by weight, preferably between 0.01 and 2.5% by weight with respect to the total weight of the polymer. The iodine atoms can be present along the chain and/or in terminal position.

To introduce iodine atoms along the chain, the copolymerization of the basic monomers of the fluoroelastomers is carried out with a suitable fluorinated comonomer containing iodine, cure-site monomer, see for instance U.S. Pat. No. 4,745,165, U.S. Pat. 4,831,085, and U.S. Pat. No. 4,214,060, European Pat. No. 95107005.1. Such a comonomer can be selected from instance from:

(a) iodo(per)fluoroalkyl-perfluorovinylethers of formula $$I—R_f—O—CF=CF_2 \quad (III)$$

wherein $R_f$ is a (per)fluoroalkylene $C_1$–$C_{12}$, optionally containing chlorine atoms and/or ethereal oxygen; for instance: $ICF_2—O—CF=CF_2$, $ICF_2CF_2—O—CF=CF_2$, $ICF_2CF_2CF—O—CF=CF_2$, $CF_3CFICF_2—O—CF=CF_2$, and the like;

(b) iodo-(per)fluoroolefins of formula:

$$I—R'_f—CF=CF_2 \quad (IV)$$

wherein $R'_f$ is a (per)fluoroalkylene $C_1$–$C_{12}$, optionally containing chlorine atoms; for instance iodotrifluoroethylene, 1-iodo-2,2-difluoroethylene, iodo-3,3,4,4-tetrafluorobutene-1, 4-iodo-perfluorobutene-1, and the like;

(c) iodo-(per)fluoroolefins of formula:

$$CHR_o=CH—Z_o—CH_2CHR_o—I \quad (V)$$

wherein $R_o$ is H or —$CH_3$; $Z_o$ is a (per)fluoroalkylenic radical $C_1$–$C_{18}$, linear or branched, optionally containing one or more oxygen atoms, or a (per)fluoropolyoxyalkylenic radical as defined above.

In alternative or in addition to the iodinated comonomer, the fluoroelastomer can contain iodine atoms in terminal position, deriving from a suitable iodinated chain transfer agent introduced in the reaction medium during the preparation of the polymer, as described in U.S. Pat. No. 4,501,869. Such transfer agents have the formula $R_f(I)_x$, wherein $R_f$ is a (per)fluoroalkylic or chlorofluoroalkylic radical $C_1$–$C_{12}$ optionally containing chlorine atoms, while x is 1 or 2. They can be selected for instance from: $CF_2I_2$, $I(CF_2)_6I$, $I(CF_2)_4I$, $CF_2ClI$, $CF_3CFICF_2I$, and the like. The iodine amount in terminal position is generally comprised between 0.001 and 3%, preferably between 0.01 and 1%, by weight with respect to the weight of fluoroelastomer. See U.S. Pat. No. 4,035,565 and U.S. Pat. No. 4,694,045. Other cure-site iodinated comonomers are iodofluoroalkylvinylethers, see U.S. Pat. No. 4,745,165 and U.S. Pat No. 4,564,662. For the iodine introduced as chain end by addition of iodinated chain transfer agents as indicated above, see for instance patents U.S. Pat. No. 4,243,770 and U.S. Pat. No. 4,943,622.

It is also possible to introduce iodine as chain end by using alkaline or alkaline-earth metals iodides, as described in EP patent application 407,937.

In combination with the chain transfer agents containing iodine, other chain transfer agents known in the art, such as ethyl acetate, diethylmalonate, etc., can be used.

Moreover the fluoroelastomes curable by peroxidic route can contain also bromine, both in chain and terminal positions.

However it does not substantially takes part in curing. The bromine in chain can be introduced according to known techniques, see for instance patents U.S. Pat. No. 4,035,565, U.S. Pat. No. 4,745,165, EP 199.138; or as terminal bromine, see U.S. Pat. No. 4,501,869.

It has been found moreover that in addition to the bis-olefins, curing agents of the invention, other non curing agents can be added, preferably TAIC. It has been noticed that small amounts of TAIC bring to an improvement of the overall properties obtainable by bis-olefin alone, such as thermal stability and mechanical properties.

This will be evident from the following illustrative examples.

The fluoroelstomers are TFE or vinylidene fluoride (VDF) copolymers and at least a fluorinated olefin having a terminal unsaturation, containing at least a fluorine atom on each carbon atom of the double bond, the other atoms can be fluorine, hydrogen, fluoroalkyl or fluoroalkoxy from 1 to 10 carbon atoms, preferably 1–4 carbon atoms. In particular the basic structure of the fluoroelastomer can be selected from (1) copolymers based on VDF, wherein the latter is copolymerized with at least a comonomer selected from perfluoroolefins $C_2$–$C_8$, such as tetrafluoroethylene (TFE), hexafluoropropene (HFP); cloro- and/or bromo- and/or iodo-fluoroolefins $C_2$–$C_8$, such as chlorotrifluoroethylene (CTFE) and bromotrifluoroethylene; (per)fluoroalkylvinylethers (PAVE) $CF_2=CFOR_f$, wherein $R_f$ is a (per)fluoroalkyl $C_1$–$C_6$, for instance trifluoromethyl, bromodifluoromethyl, pentafluoropropyl; perfluoro-oxyalkylvinylethers $CF_2=CFOX$, wherein X is a perfluorooxyalkyl $C_1$–$C_{12}$ having one or more ethereal groups, for instance perfluoro-2-propoxy-propyl; non fluorinated olefins (Ol) $C_2$–$C_8$, for instance ethylene and propylene;

(2) TFE based copolymers, which are the preferred ones according to the present invention, wherein TFE is copolymerized with at least a comonomer selected from (per)fluoroalkylvinylethers (PAVE) $CF_2=CFOR_f$, wherein $R_f$ has the meaning of $R_f$; perfluoro-oxyalkylvinylethers $CF_2=CFOX$, wherein X is defined as above; fluoroolefins $C_2$–$C_8$ containing hydrogen and/or chlorine and/or bromine and/or iodine atoms; non fluorinated olefins (Ol) $C_2$–$C_8$.

Inside the classes defined above, preferred basic monomeric compositions are the following (% by moles):

(a) VDF 45–85%, HFP 15–45%, 0–30% TFE; (b) VDF 50–80%, PAVE 5–50%, TFE 0–20%; (c) VDF 20–30%, Ol 10–30%, HFP and/or PAVE 18–27%, TFE 10–30%; (d) TFE 50–80%, PAVE 20–50%; (e) TFE 45–65%, Ol 20–55%, 0–30% VDF; (f) TFE 32–60%, Ol 10–40%, PAVE 20–40%.

The fluoroelastomers can contain also monomeric units in the chain deriving from small amounts of a bis-olefin (I) as described in European patent application No. 94120504.9 generally 0.01–1% by moles with respect to the polymer.

Other fluoroelastomers which can be used are those having a high content of fluorine, which have for instance the following composition:

33–75% by moles of tetrafluoroethylene (TFE), preferably 40–60%;

15–45% by moles of a perfluorovinylether (PVE) preferably 20–40%;

10–22% by moles of vinylidene fluoride (VDF), preferably 15–20%.

The PVE have the formula: $CF_2=CFO—R_f$, with $R_f=$ perfluoroalkyl $C_1$–$C_6$, preferably $C_1$–$C_4$, or containing one more ethereal groups $C_2$–$C_9$.

The iodinated polymers indicated above are commercially known for instance as: DAIEL® G902 and DAIEL® Perfluoro by Daikin Industries, Tecnoflon® PFR 94 by Ausimont.

Curing by peroxidic route is carried out, according to known techniques, by addition of peroxides capable of generating radicals by heating. Among the most commonly used peroxides we can cite: dialkylperoxides, such as for instance di-terbutyl-peroxide and 2,5-dimethyl-2,5-di(terbutylperoxy)hexane; dicumyl peroxide; dibenzoyl peroxide; diterbutyl perbenzoate; di(1,3-dimethyl-3-(terbutylperoxy) butyl carbonate. Other peroxidic systems are described, for instance, in European patent applications EP 136,596 and EP 410,351.

Other products are then added to the curing blend, such as:

(a) optionally other curing coagents, besides those of the invention, in amounts generally comprised between 0.01 and 3%, preferably between 0.1 and 1%, by weight with respect to the polymer; among them those commonly used are: triallyl-cyanurate; triallyl-isocyanurate (TAIC) tris(diallylamine)-s-triazine; triallylphosphite; N,N-diallyl-acrylamide, N,N,N',N'-tetraallyl-malonamide trivinyl-isocyanurate; 2,4,6-trivinyl-methyltrisiloxane etc.; TAIC is particularly preferred;

(b) a metal compound, in amounts comprised between 1 and 15% preferably between 2 and 10%, by weight with respect to the polymer, selected from oxides or hydroxides of divalent metals, such as for instance Mg, Zn, Ca or Pb optionally combined with a salt of a weak acid, such as for instance stearates, benzoates, carbonates, oxalates or phosphites Ba, Na, K, Pb, Ca;

(c) other conventional additives, such as reinforcing fillers, pigments, antioxidants, stabilizers and the like.

The preparation of the fluoroelastomers object of the present invention can be carried out by copolymerization of the monomers in aqueous emulsion according to the methods well known in the art, in the presence of radicalic initiators (for instance persulphates, perphosphates, perborates or alkaline or ammonium carbonates or percarbonates, optionally with ferrous or silver salts or of other metals easily oxidizable. Surfactants, such as for instance (per) fluoroalkyls carboxylates or sulphonates (for instance ammonium perfluorooctanoate) or (per)fluoropolyoxyalkylenic, or other known in the art, are also present in the reaction medium.

when the polymerization is over, the fluoroelastomer is isolated from the emulsion by conventional methods, such as coagulation by addition of electrolytes or by cooling.

Alternatively, the polymerization reaction can be carried out in mass or in suspension, in an organic liquid wherein a suitable radicalic initiator is present, according to well known techniques.

The polymerization reaction is generally carried out at temperatures comprised between 25° and 150° C. under pressure up to 10 MPa.

The preparation of the fluoroelastomers object of the present invention is preferably carried out in aqueous emulsion in the presence of an emulsion, dispersion or microemulsion of perfluoropolyoxyalkylenes, according to U.S. Pat. No. 4,789,717 and U.S. Pat. No. 4,864,006, which are incorporated herein by reference.

The following examples are given for illustrative purposes but are not limitative of the scope of the present invention.

EXAMPLES 1–7

Example 1

A rubber TECNOFLON® PFR 94 (perfluoromethylvinylether PMVE 40% moles, 60% moles TFE), containing 0.4% by weight of iodine deriving from the introduction of the chain transfer agent $C_6F_{12}I_2$ and 0.057% by moles of a bisolefin BO having formula $CH_2=CH(CF_2)_6CH=CH_2$ was used for the preparation of the curable compositions of the present invention.

To 100 g of such rubber were mixed:

1,5 phr of peroxide LUPERCO® 101 XL (2,5-dimethyl-2,5-di(terbutylperoxy)hexane);

2,13 phr of BO having the formula $CH_2=CH(CF_2)_6CH=CH_2$;

5 phr of ZnO;

15 phr of carbon black MT.

The mixing was carried out in an open mixer.

The curing curve was determined on the composition thus obtained by Oscillating Disk Rheometer (ODR) by Monsanto (100G Model), according to ASTM D2084-81, by operating at 177° C. with an oscillation amplitude of 3°.

The data (ODR) are reported in Table 1:

$M_L$ (minimum torque); $M_H$ (maximum torque); $t_{S2}$, (time required for an increase of the torque of 2 lb. in above $M_L$); t'50 and t'90 (time required for an increase of 50% and of 90% respectively, of the torque).

On the cured product were determined and reported in Table 1:

compression set on O-ring at 200° C. for 70 h after post curing at 200° C. for 8 h (ASTM D395);

the mechanical properties after post-curing at 200° C. for 8 h (ASTM D412-83), in particular the thermal ageing a 275° C. for 70 h (ASTM D573).

Example 2 (comparative)

Example 1 was repeated by using 2 phr of TAIC instead of bisolefin.

Example 3

Example 1 was repeated but by using 0.67 phr of TAIC and 1.42 phr of bisolefin.

Example 4

Example 3 was repeated but by using 0.2 phr of TAIC and 1.91 phr of bisolefin.

TABLE 1

| Blend composition | | ex. 1 | ex. 2 comp. | ex. 3 | ex. 4 |
|---|---|---|---|---|---|
| PFR 94 | (g) | 100 | 100 | 100 | 100 |
| Luperco ® 101XL | (phr) | 1.5 | 1.5 | 1.5 | 1.5 |
| TAIC drymix | " | — | 2 | 0.67 | 0.2 |
| BO | " | 2.13 | — | 1.42 | 1.91 |
| ZnO | " | 5 | 5 | 5 | 5 |
| Carbon black MT | " | 15 | 15 | 15 | 15 |
| Blends characteristics ODR at 177° C., arc 3° (ASTM D2084-81) | | | | | |
| ML | (lb. in) | 4 | 4 | 7 | 6 |
| MH | " | 101 | 145 | 118 | 109 |
| ts2 | (sec) | 81 | 57 | 60 | 66 |
| t'50 | " | 153 | 81 | 84 | 108 |
| t'90 | " | 240 | 117 | 159 | 258 |
| Mechanical properties after post curing at 200° C. × 8 h (ASTM D412-83) | | | | | |
| Modulus at 100% | (MPa) | 7.7 | 7.9 | 7 | 6.3 |
| Stress at break | " | 21.1 | 19.1 | 19.8 | 19.4 |
| Elong. at break | (%) | 195 | 164 | 182 | 195 |
| Shore Harness A | (points) | 74 | 71 | 70 | 74 |
| Mechanical properties after ageing at 275° C. × 70 h (ASTM D573) | | | | | |
| Variation Mod100 | (%) | 24 | −46 | −39 | −3 |
| Variation Stress | " | 2 | −30 | −25 | −6 |

TABLE 1-continued

| Blend composition | | ex. 1 | ex. 2 comp. | ex. 3 | ex. 4 |
|---|---|---|---|---|---|
| Variation Elong. | " | | −15 | 107 | 45 | 0.5 |
| Variation Hardness | (points) | 1 | 1 | 0 | 2 |
| Compression set at 200° C. × 70 h after post-curing at 200° × 8 h (ASTM D395) | | | | | |
| O-Ring | % | 39 | 19 | 29 | 27 |

From the results of table 1 it can be noticed that the curing system of the invention (bisolefins) compared with the conventional curing system (TAIC) allows to obtain cured articles capable of withstanding 275° C. while the cured articles with TAIC are products which have no industrial applicability at these temperatures.

Small amounts of TAIC added to the bis-olefin allow to obtain products which combine high thermal resistance properties at 275° C. with an improvement of the compression set compared with products cured with bis-olefin alone.

Examples 5–6

Example 1 was repeated but by using the compositions of Table 2 and as polymer Tecnoflon® PFR 94 M295 by Ausimont.

The thermal resistance was determined both at 275° C. and also at 300° C. according to ASTM D573 as reported in Table 2.

TABLE 2

| Blend composition | | ex. 5 | ex. 6 |
|---|---|---|---|
| PFR 94 M295 | (g) | 100 | 100 |
| Luperco® 101XL | (phr) | 4 | 4 |
| TAIC drymix | " | 0.2 | — |
| BO | " | 4 | 4 |
| ZnO | " | 3 | 3 |
| Carbon black MT | " | 30 | 30 |
| Blends characteristics ODR at 177° C., arc 3° (ASTM D2084-81) | | | |
| ML | (lb. in.) | 7 | 6 |
| MH | " | 127 | 113 |
| ts: | (sec) | 48 | 63 |
| t'50 | " | 93 | 129 |
| t'90 | " | 240 | 330 |
| Mechanical properties after post curing at 200° C. × 8 h (ASTM D412-83) | | | |
| Modulus 100% | (MPa) | 14.4 | 13 |
| Stress at break | " | 23 | 22.6 |
| Elongation at break | (%) | 148 | 158 |
| Shore hardness A | (points) | 80 | 80 |
| Mechanical properties after ageing at 275° C. × 70 h (ASTM D573) | | | |
| Variation Modulus | (%) | −30 | −13 |
| Variation Stress | " | −29 | −23 |
| Variation Elongation | " | −30 | −3 |
| Variation Hardness | (points) | +2 | +1 |
| Mechanical properties after ageing at 300° C. × 70 h (ASTM D573) | | | |
| Variation Modulus | (%) | −80 | −74 |
| Variation Stress | " | −82 | −85 |
| Variation Elongation | " | −51 | −18 |
| Variation Hardness | (points) | −3 | −1 |
| Compression set at 200° C. × 70 h after post-curing 200° C. × 8 h (ASTM D395) | | | |
| O-Ring | | 25 | 33 |

From the results of Table 2 it can be noticed that also at 300° C. the cured polymers according to the curing system of the present invention still show an high thermal resistance especially as shown by the variation data of elongation at break.

We claim:

1. Curing system for fluoroelastomers curable by peroxidic route which comprise iodine comprising as curing agent a bis-olefin having general formula

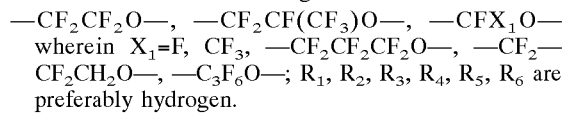

wherein:
R$_1$, R$_2$, R$_3$, R$_4$, R$_5$, R$_6$, equal to or different from each other, are H or alkyls C$_1$–C$_5$;
Z is a linear or branched alkylenic or cycloalkylenic radical C$_1$–C$_{18}$, optionally containing oxygen atoms, or a (per)fluoropolyoxyalkylenic radical.

2. Curing system for fluoroelastomers curable by peroxidic route which comprise iodine according to claim 1, wherein Z is a perfluoroalkylenic radical C$_4$–C$_{12}$, or a (per)fluoropolyoxyalkylenic radical comprising one or more units selected from the following:
—CF$_2$CF$_2$O—, —CF$_2$CF(CF$_3$)O—, —CFX$_1$O— wherein X$_1$=F, CF$_3$, —CF$_2$CF$_2$CF$_2$O—, —CF$_2$—CF$_2$CH$_2$O—, —C$_3$F$_6$O—; R$_1$, R$_2$, R$_3$, R$_4$, R$_5$, R$_6$ are preferably hydrogen.

3. Curing system for fluoroelastomers curable by peroxidic route which comprise iodine according to claim 2, wherein Z is a perfluorooxyalkylene having the formula:

$$-(Q)_p-CF_2O-(CF_2CF_2O)_m(CF_2O)_n-CF_2-(Q)_p- \qquad (II)$$

wherein: Q is a alkylenic or oxyalkylenic radical C$_1$–C$_{10}$; p is 0 or 1; m and n are such numbers that the m/n ratio is comprised between 0.2 and 5 and the molecular weight of said (per)fluoropolyoxyalkylenic radical is comprised between 500 and 10,000.

4. Curing system for fluoroelastomers curable by periodic route which comprise iodine according to claim 3, wherein the amount of curing agent is between 0.5–10% by weight with respect to the polymer.

5. Curing system for fluoroelastomers curable by peroxidic route which comprise iodine according to claim 4, wherein the iodine contained in the fluoroelastomer is present in terminal position and/or as iodinated comonomer in the polymeric chain.

6. Curing system for fluoroelastomers curable by peroxidic route which comprise iodine according to claim 5, further containing additional curing agents.

7. Curing system for fluoroelastomers curable by peroxidic route which comprise iodine according to claim 6, wherein the additional curing agent is triallyl-isocyanurate.

8. Curing system for fluoroelastomers curable by peroxidic route which comprise iodine according to claim 7, wherein the fluoroelastomer is a TFE and/or vinilydene fluoride copolymer having at least a fluorinated olefin having a terminal unsaturation, containing at least a fluorine atom on each carbon atom of the double bond, the other atoms can be fluorine, hydrogen, fluoroalkyl or fluoroalkoxy from 1 to 10 carbon atoms.

9. Curing system for fluoroelastomers curable by peroxidic route which comprise iodine according to claim 8, wherein the fluoroelastomer is a TFE copolymer.

10. Curing system for fluoroelastomers curable by peroxidic route which comprise iodine according to claim 8 or 9, wherein the fluoroelastomer is selected from:
(1) copolymers based on VDF, copolymerized with at least a comonomer selected from: perfluoroolefins C$_2$–C$_8$, such as tetrafluoroethylene (TFE), hexafluoropropene (HFP); cloro- and/or bromo- and/or iodo-fluoroolefins $C_2$–$C_8$, such as chlorotrifluoroethylene (CTFE) and bromotrifluoroethylene; (per)fluoroalkylvinylethers (PAVE) $CF_2$=$CFOR_f$, wherein $R_f$, is a (per)fluoroalkyl $C_1$–$C_6$, for instance trifluoromethyl, bromodifluoromethyl, pentafluoropropyl; perfluoro-oxyalkylvinylethers $CF_2$=$CFOX$, wherein X is a perfluoro-oxyalkyl $C_1$–$C_{12}$ having one or more etheral groups, for instance perfluoro-2-propoxypropyl; non fluorinated olefins (Ol) $C_2$–$C_8$, for instance ethylene and propylene (2) TFE based copolymers, wherein TFE is copolymerized with at least a comonomer selected from: (per)fluoroalkylvinylethers (PAVE) $CF_2$=$CFOR_f$, wherein $R_f$ is defined above; perfluoro-oxyalkylvinylethers $CF_2$=$CFOX$, wherein X is defined as above, fluoroolefins $C_2$–$C_8$ containing hydrogen and/or chlorine and/or bromine and/or iodine atoms; and non fluorinated olefins (01) $C_2$–$C_9$.

11. Curing system for fluoroelastomers curable by peroxidic route which comprise iodine according to claim 10, wherein the basic monomeric compositions are selected from the following ones (% by moles):

(a) VDF 45–85%, HFP 15–45%, 0–30% TFE; (b) VDF 50–80%, PAVE 5–50%, TFE 0–20%; (c) VDF 20–30%, Ol 10–30%, HFP and/or PAVE 18–27%, TFE 10–30%; (d) TFE 50–80%, PAVE 20–50%; (e) TFE 45–65%, Ol 20–55%, 0–30% VDF; (f) TFE 32–60%, Ol 10–40%, PAVE 20–40% optionally containing small amounts of a bis-olefin of formula (I);

33–75% by moles of tetrafluoroethylene (TFE), preferably 40–60%;

15–45% by moles of a perfluorovinylether (PVE), preferably 20–40%;

10–22% by moles of vinylidene fluoride (VDF), preferably 15–20%.

12. Fluoroelastomers curable by peroxidic route which comprise iodine comprising the curing system of claim 1.

13. Cured fluoroelastomers by peroxidic route which comprise iodine comprising the curing system of claim 1.

14. Use of fluoroelastomers cured by peroxidic route which comprise iodine according to claim 13 for obtaining gaskets and seal rings.

15. The curing system of claim 1, wherein the linear or branched alkylenic or cycloalkylenic radical $C_1$–$C_{18}$ is at least partially fluorinated.

* * * * *